United States Patent
West

[15] 3,693,037
[45] Sept. 19, 1972

[54] DYNAMO ELECTRIC MACHINES

[72] Inventor: John Godfrey Wilson West, Sutton Coldfield, Warwickshire, England

[73] Assignee: Joseph Lveas (Industries) Limited, Birmingham, England

[22] Filed: April 29, 1971

[21] Appl. No.: 138,662

[52] U.S. Cl. ............... 310/154, 310/190, 310/254
[51] Int. Cl. ................................................. H02k 21/76
[58] Field of Search ............ 310/154, 254, 258, 259, 216–218, 310/187, 190–193, 166, 152

[56] References Cited

UNITED STATES PATENTS

| | | |
|---|---|---|
| 2,479,455 | 8/1949 | Aronoff .................. 310/154 |
| 3,173,042 | 3/1965 | Fodor .................... 310/152 X |
| 3,361,917 | 1/1968 | Stahly ................... 310/154 |
| 3,567,979 | 2/1971 | Jaffe et al. ............. 310/154 X |
| 2,842,729 | 7/1958 | Hillman ................. 310/166 X |
| 3,277,324 | 10/1966 | Beaudoin et al. ....... 310/216 X |

FOREIGN PATENTS OR APPLICATIONS

| | | |
|---|---|---|
| 1,941,180 | 2/1970 | Germany ............... 310/154 |

*Primary Examiner*—D. F. Duggan
*Attorney*—Holman & Stern

[57] ABSTRACT

A dynamo electric machine including at least a pair of pole pieces. Each pole piece is divided into two parts and yoke member are provided to connect one part of one pole piece with one part of the other pole piece. The yoke members are magnetically isolated from each other and the arrangement is such that the armature action flux which would tend to de-magnetize one part of each pole piece is minimized.

9 Claims, 5 Drawing Figures

INVENTOR
John Godfrey Wilson West

ATTORNEYS

DYNAMO ELECTRIC MACHINES

This invention relates to dynamo electric machines of the kind having at least one pair of pole pieces and a permanent magnet for producing a magnetic field between said pole pieces.

The object of the invention is to provide such a machine in a simple and convenient form.

According to the invention each pole piece is divided into two parts, one part of one pole piece being interconnected with a part of the corresponding pole piece by a yoke member and the other part of said one pole piece being interconnected with the other part of the other pole piece by means of a further yoke member, said yoke members being magnetically isolated from each other.

One example of a dynamo electric machine in accordance with the invention will now be described with reference to the accompanying drawings in which.

Figure 1:
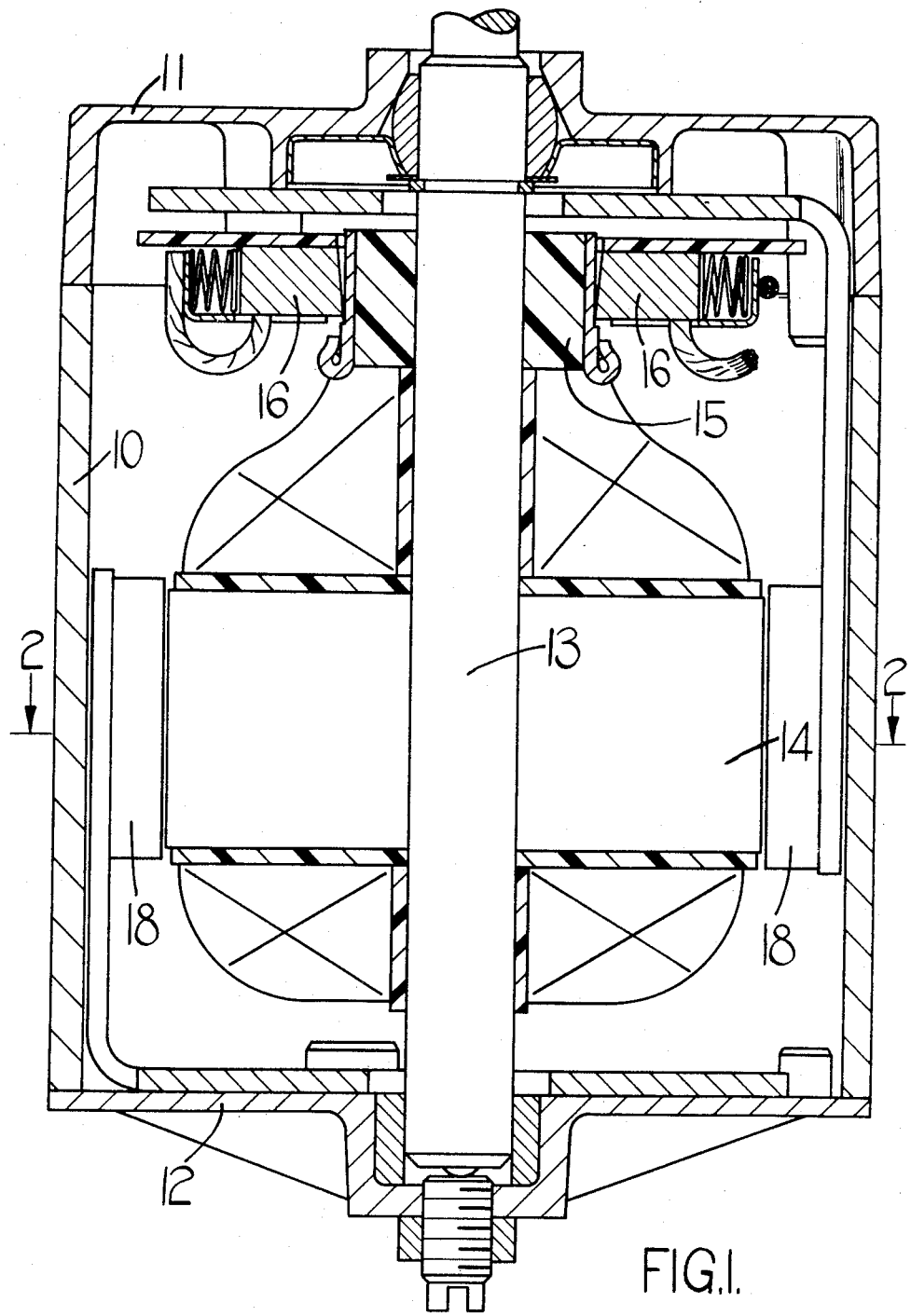
FIG. 1 is a sectional side elevation of the machine.
Figure 2:
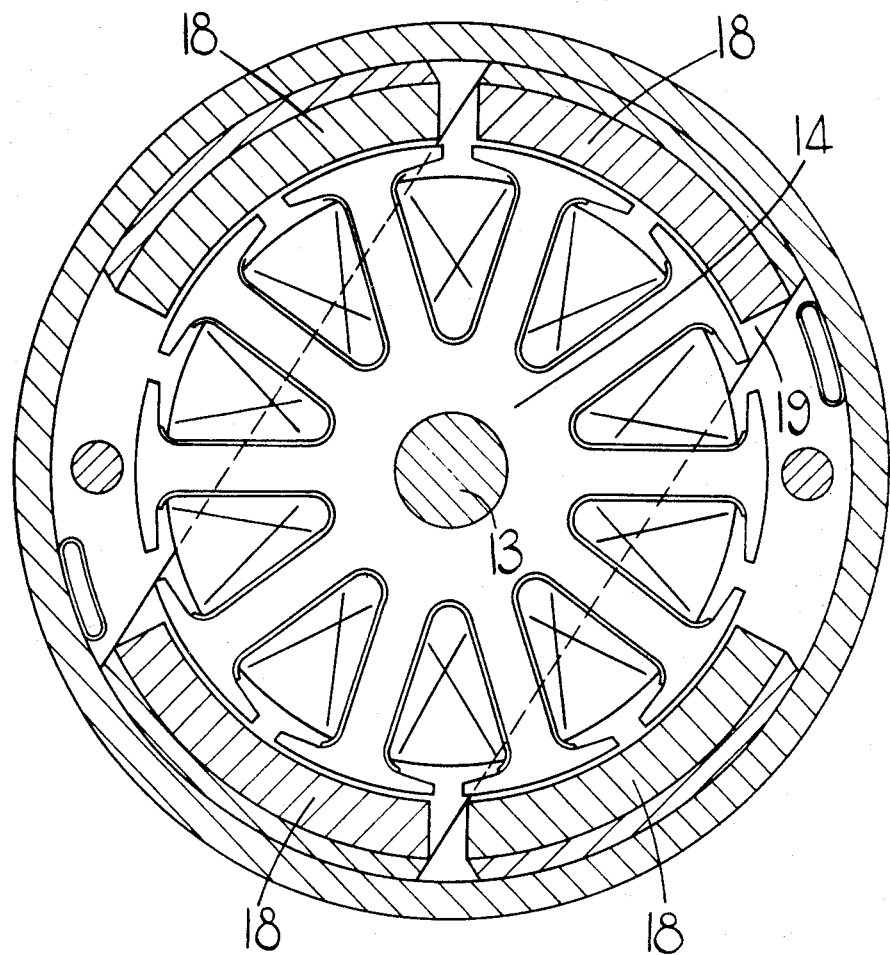
FIG. 2 is a section on the line 2—2 of FIG. 1.
Figure 3:
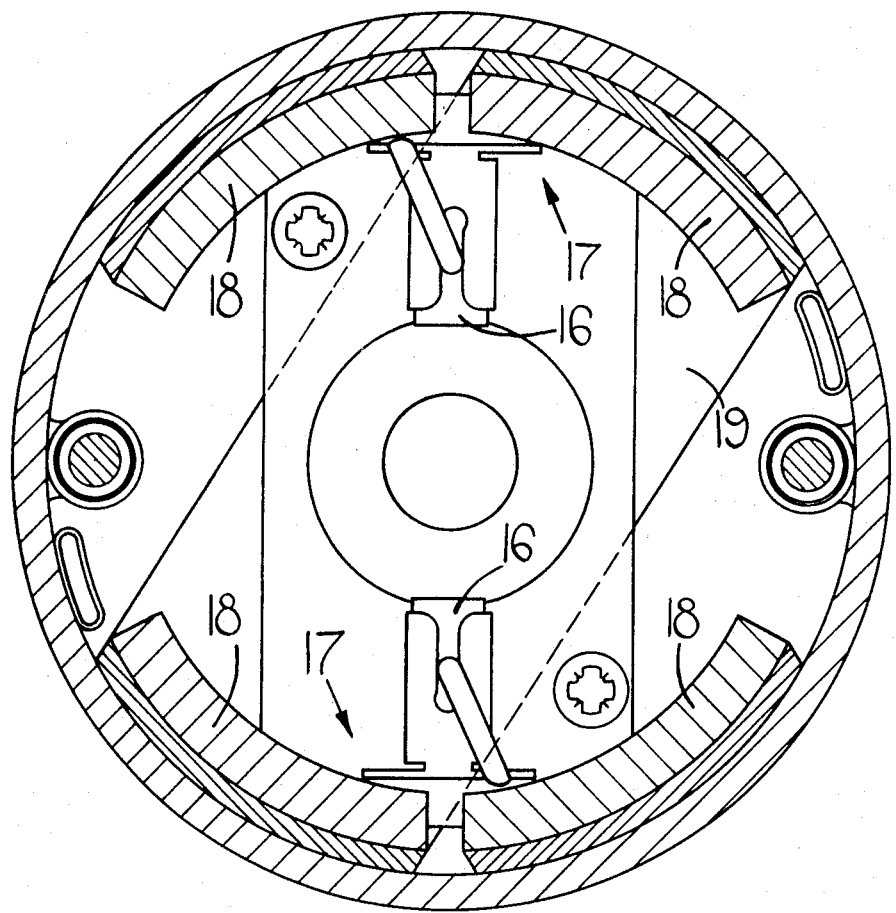
FIG. 3 is an end view of the interior of the machine with one end cover and the armature removed.

With reference to the drawings the machine comprises a non-magnetic casing 10 of hollow plain cylindrical form and having end closures 11, 12 each of which carries a bearing for a rotary shaft 13. Mounted on the shaft is a rotor structure comprising an armature 14 of conventional type and including a commutator 15 upon which bear a pair of bushes 16 for connection respectively to the positive and negative terminals of a source of d.c. supply.

Also provided is a stator structure which comprises a pair of pole pieces indicated at 17. Each pole piece 17 is constituted by a pair of permanent magnets 18 conveniently formed from ferrite material and the magnets of one pole piece are polarized in like manner and opposite to those of the other pole piece.

Moreover, each pair of magnets 18 constituting a pole piece are spaced apart in the circumferential direction so that each pole piece has a central and axially extending gap. Furthermore, diametrically opposite magnets 18 are interconnected by yoke members 19. The yoke members 19 are formed from magnetizable material and are magnetically separated from each other. The yoke members extend across the opposite ends of the armature 14 and are provided with apertures through which the ends respectively of the shaft 13 pass.

The yoke members are divided so that the effect of the armature reaction current which flows in the pole piece is minimized. The normal effect of the armature reaction current in the case of a motor is to increase the lines of force in the leading portion of the pole piece but to reduce it in the trailing portion of the pole piece. This effect is reduced by dividing the pole piece magnetically into two parts.

In the example shown the magnets 18 are formed from ferrite material having the same composition. However, if desired the magnets 18 forming the pole pieces may be of different material. In the case of a motor the magnets 18 which are trailing would be formed from material having a high coercive force that is to say having an ability to retain the magnetism in spite of the demagnetizing effect of the armature reaction current. The other magnets are formed from material having a high remanence.

Figure 4:
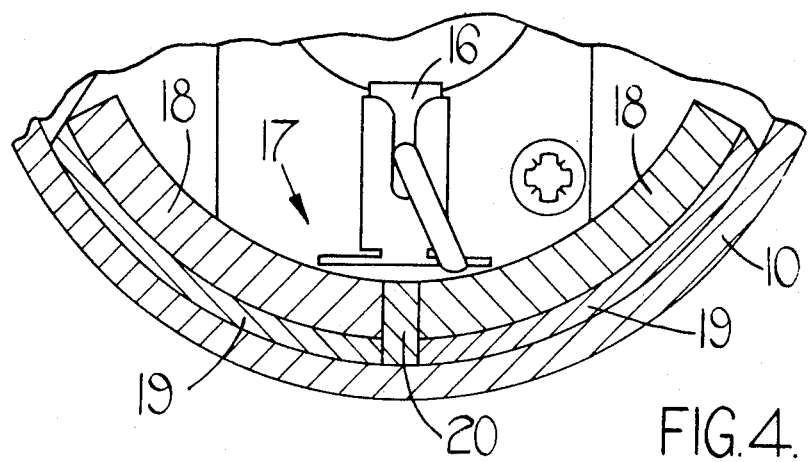
FIG. 4 is a view similar to FIG. 3 showing part of a modification.

When ferrite material is used for the magnets 18, the magnets of each pole piece can be formed in one piece since ferrite material has a high reluctance. However, in order to further minimize the effect of the armature reaction there may be disposed in the gaps between the magnets and pole pieces further magnets 20 which are polarized in a circumferential direction to oppose the armature reaction flux. This arrangement is shown in FIG. 4.

Figure 5:
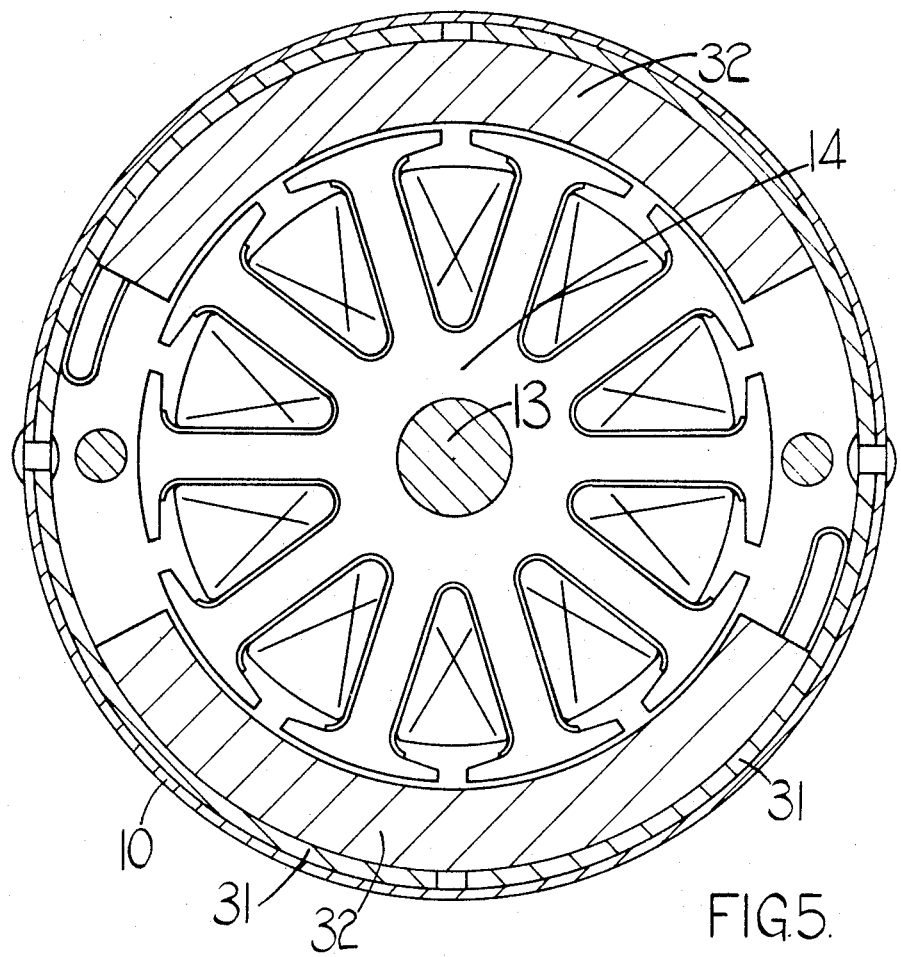
FIG. 5 is a section through an alternative form of machine.

In the arrangements shown in FIG. 1-4 inclusive the corresponding portions i.e., the trailing portion and leading portion of the two pole pieces are interconnected by the yoke members. In the arrangement shown in FIG. 5 however the trailing portion of one pole piece is interconnected with the leading portion of the other pole piece. In this case the yoke members 31 extend in the circumferential direction and are riveted or otherwise secured to the internal surface of the casing 10. FIG. 5 also shows the use of single ferrite magnets 32 for each pole piece. As in the previous example gaps exist between the yoke members 31 to minimize the effect of armature reaction.

I claim:

1. A dynamo electric machine of the kind comprising a stator structure having at least one pair of pole pieces, a permanent magnet forming part of the stator structure for producing a magnetic field between the pole pieces, a rotor structure rotatably mounted relative to the stator structure, and current carrying windings on the rotor structure through which when the machine is in use, current flows, each pole piece being divided into two parts, a yoke member interconnecting one part of one pole piece with a part of the corresponding pole piece, and a further yoke member interconnecting the other part of said one pole piece with the other part of the other pole piece, said yoke members being magnetically isolated from each other.

2. A machine as claimed in claim 1 in which the trailing and leading parts of one pole piece are connected to the trailing and leading parts of the other pole piece respectively.

3. A machine as claimed in claim 1 in which the trailing and leading parts of one pole piece are connected to the leading and trailing parts of the other pole piece respectively.

4. A machine as claimed in claim 2 in which the yoke members extend across opposite ends of the rotor structure respectively.

5. A machine as claimed in claim 4 in which the parts of the pole piece are each provided with a permanent magnet.

6. A machine as claimed in claim 5 in which the magnets are formed from ferrite material.

7. A machine as claimed in claim 6 in which the two magnets of each pole piece are formed from different material.

8. A machine as claimed in claim 6 in which each pole piece is provided with a single magnet.

9. A machine as claimed in claim 8 in which the ferrite magnet bridges the parts of the pole piece.

* * * * *